United States Patent Office 3,309,398
Patented Mar. 14, 1967

3,309,398
4-HALO AND 4-OXYGENATED-B-NORTESTOSTER-ONES AND B-NORPROGESTERONES
James F. Kerwin, Broomall, Pa., assignor to Smith Kline & French Laboratories, Philadelphia, Pa., a corporation of Pennsylvania
No Drawing. Filed Aug. 31, 1964, Ser. No. 393,365
13 Claims. (Cl. 260—488)

The present invention relates to a series of 4-substituted-B-norsteroid chemical compounds. More specifiically, the invention relates to 4-cholor-, 4-bromo-, 4-hydroxy-, and 4-acetoxy-B-nortestosterones and B-nonprogesterones having antiandrogenic and central nervous system depressant activities. The compounds of the invention are thus useful in those instances in which it is desired to diminish the effects of androgens, e.g., acne, hirsutism, etc., and when a sedative effect is desired.

The chemical compounds of the present invention have the following structural formula:

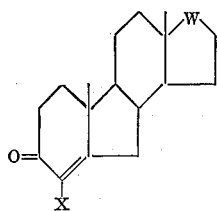

wherein X can be chloro, bromo, hydroxy, or acetoxy; and

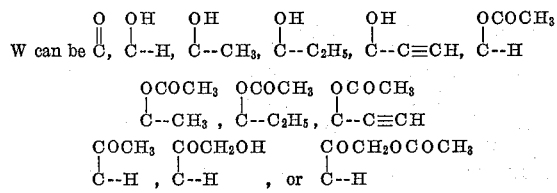

The compounds of the invention are prepared by treating a B-nortestosterone or B-norprogesterone, in which any hydroxy groups which may be present have been protected by acetylation or other suitable means known to the art, with sulfuryl chloride or sulfuryl bromide. These latter reagents may tend to dehydrate any hydroxy groups that may be present, thus necessitating the protection of such hydroxy groups. The sulfuryl chloride or bromide places the appropriate halogen atom at the 4-position of the starting B-norsteroid. Mild hydrolysis with an alkali metal carbonate regenerates any protected hydroxy groups.

The compounds having a 4-hydroxy group are produced by heating the 4-chloro or 4-bromosteroid with a strong base, such as aqueous potassium hydroxide or sodium hydroxide. An alcoholic solvent such as tert-butyl alcholo may be used to aid in solubilizing the steroid. Heating at reflux temperature for a number of hours generally suffices to hydrolyze the 4-halo group as well as any esterified hydroxy groups that may be present on the molecule.

The above-described synthetic route is illustrated schematically below, for the preparation of 4-chloro-B-nortestosterone acetate (I) and 4-hydroxy-B-nortestosterone (II):

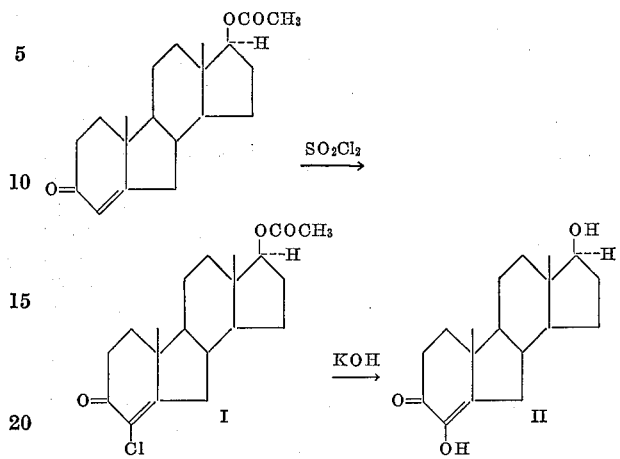

Both of these compounds are particularly active as antiandrogens.

An alternate method of preparation of the 4-substituted-B-norsteroids of the present invention invloves the epoxidation by means of alkaline hydrogen peroxide to form a 4,5-epoxy-B-norsteroid. The epoxide is then treated with hydrogen chloride or hydrogen bromide to form, respectively, the 4-chloro or 4-bromo-B-norsteroid. Alternatively, the epoxide may be treated with aqueous acid to form the 4-hydroxy-$\Delta^4$-B-norsteroid.

The 4-unsubstituted B-nortestosterones and B-norprogesterones which serve as starting materials for the compounds of the present invention are described in the literature. Particular reference is made to U.S. Patent No. 3,072,681, Chem. and Ind. 1665–66 (1958), and Coll. Czech. Chem. Comm. 26, 2050 (1961), wherein the preparation of all the starting materials is described.

The following example illustrates the manner and process of preparing the compounds of the present invention, but are not to be construed as limiting the scope thereof. All temperatures and melting points are expressed in degrees Centrigrade.

*Example 1.—B-nortestosterone acetate*

A mixture of 15 g. of B-nortestosterone (Chem. and Ind. 1665–66 (1958)), 60 ml. of pyridine, and 30 ml. of acetic anhydride is warmed slightly to effect complete solution, and the solution is then allowed to stand at room temperature overnight. The mixture is poured into 1 litre of ice water, allowed to stand, and the resulting white crystalline solid filtered off and dried; M.P. 133–135°. Recrystállization from methanol gives the product, M.P. 137–139°.

*Example 2.—4-chloro-B-nortestosterone acetate*

A solution of 4.0 g. of B-nortestosterone acetate (prepared as in Example 1) in 40 ml. of pyridine is cooled to −3° in an ice-salt mixture, and treated dropwise at 0° with 2.0 ml. of sulfuryl chloride. The resulting suspension is stirred at 0° for an additional hour, then poured onto an icy diluted hydrochloric acid solution. The solid is extracted with methylene chloride and the organic extracts washed with dilute hydrochloric acid, water, 5% sodium bicarbonate solution, and water. The solvent is dried with sodium sulfate, and evaporated in vacuo to leave a buff-colored crystalline residue, which upon recrystallization from methanol yields the products, M.P. 180–185°. Further recrystallization from absolute ethanol raises the melting point to 193–195°.

*Example 3.—4-chloro-B-nortestosterone*

A solution of 6.0 g. of 4-chloro-B-nortestosterone acetate (prepared as in Example 2) in 25 ml. of methanol is treated with a solution of 4.0 g. of potassium carbonate in 15 ml. of water. The mixture is refluxed for three hours and then poured into 2 liters of water. After the solution is allowed to cool, the solid precipitate is filtered off and recrystallized from aqueous methanol with the aid of Darco to yield the product, M.P. 138–140°. Additional recrystallization raises the melting point to 141.5–143°.

*Example 4.—4-hydroxy-B-nortestosterone*

A solution of 3.0 g. of 4-chloro-B-nortestosterone acetate (prepared as in Example 2) and 3.0 g. of potassium hydroxide in 60 ml. of water and 300 ml. of tert-butyl alcohol is refluxed under nitrogen with rapid stirring for twenty hours. The dark solution is poured onto 2 liters of ice water, and acidified with a few drops of glacial acetic acid. The mixture is then extracted wtih methylene chloride and the organic extracts are washed with 5% sodium bicarbonate solution and water. After drying with sodium sulfate, the solvent is evaporated, leaving a yellowish crystalline residue. Recrystallization from ethyl acetate gives the product, M.P. 182–190°. After two further recrystallizations, the product melts at 186–189°.

*Example 5.—4-hydroxy-B-nortestosterone diacetate*

4-hydroxy-B-nortestosterone (15 g., prepared as in Example 4) is heated with 30 ml. of acetic anhydride in 60 ml. of pyridine, the reaction mixture is allowed to stand for a period of time, and is then poured onto ice water. The product is then isolated by filtration and recrystallized according to the procedure of Example 1.

*Example 6.—4-bromo-B-nortestosterone and acetate*

A solution of 4 g. of B-nortestosterone acetate (prepared as in Example 1) in 40 ml. of pyridine is treated with 2 ml. of sulfuryl bromide and the 4-bromo-B-nortestosterone acetate is then isolated according to the procedure of Example 2. Hydrolysis of the acetate with a solution of 4.0 g. of potassium carbonate in 15 ml. of water is carried out according to the procedure of Example 3 to form 4-bromo-B-nortestosterone.

*Example 7.—17 -methyl-B-nortestosterone acetate*

17α-methyl-B-nortestosterone (15 g., U.S. Patent No. 3,072,681) is heated with 30 ml. of acetic anhdried in 60 ml. of pyridine and the product isolated according to the procedure of Example 1 to form the title product.

*Example 8.—4-chloro-17α-methyl-B-nortestosterone acetate*

A solution of 4 g. of 17α-methyl-B-nortestosterone acetate (prepared as in Example 7) in 40 ml. of pyridine is treated with 2 ml. of sulfuryl chloride and then isolated according to the procedure of Example 2 to form the title product.

*Example 9.—4-bromo-17α-methyl-B-nortestosterone acetate*

A solution of 4 g. of 17α-methyl-B-nortestosterone acetate (prepared as in Example 7) in 40 ml. of pyridine is treated with 2 ml. of sulfuryl bromide and then isolated according to the procedure of Example 2 to form the title products.

*Example 10.—4-hydroxy-17α-methyl-B-nortestosterone*

A solution of 3 g. of 4-chloro-17α-methyl-B-nortestosterone acetate (prepared as in Example 8) and 3 g. of potassium hydroxide in 60 ml. of water and 300 ml. of tert-butyl alcohol is refluxed under nitrogen for twenty hours. The solution is worked up according to the procedure of Example 4 to form the title product.

*Example 11*

By treating 4 g. of 17α-ethyl-B-nortestosterone acetate (prepared as in Example 1 from starting material in U.S. Patent No. 3,072,681) with 2 ml. of sulfuryl chloride or 2 ml. of sulfuryl bromide according to the procedures of Examples 2, 8, and 9, 4-chloro-17α-ethyl-B-nortestosterone acetate and 4-bromo-17α-ethyl-B-nortestosterone acetate, respectively, are obtained. Treatment of 3 g. of the 4-chloro compound with 60 ml. of 5% aqueous potassium hydroxide as described in Examples 4 and 10 results in the formation of 4-hydroxy-17α-ethyl-B-nortestosterone.

*Example 12*

By treating 4 g. of 17α-ethynyl-B-nortestosterone acetate (prepared as in Example 1 from starting material in U.S. Patent No. 3,072,681) with 2 ml. of sulfuryl chloride or 2 ml. of sulfuryl bromide according to the procedures of Examples 2, 8, and 9, 4-chloro-17α-ethynyl-B-nortestosterone acetate and 4-bromo-17α-ethynyl-B-nortestosterone acetate, respectively, are obtained. Treatment of 3 g. of the 4-chloro compound with 60 ml. of 5% aqueous potassium hydroxide as described in Examples 4 and 10 results in the formation of 4-hydroxy-17α-ethynyl-B-nortestosterone.

*Example 13.—4-chloro-B-norprogesterone and 4-bromo-B-norprogesterone*

A solution of 4 g. of B-norprogesterone (U.S. 3,072,-681) in 40 ml. of pyridine is cooled and treated with 2 ml. of sulfuryl chloride. After stirring at 0° for an additional hour, the reaction mixture is worked up according to the procedure of Example 2, and the 4-chloro product obtained. Substitution of sulfuryl bromide in place of sulfuryl chloride in the above reaction results in the formation of 4-bromo-B-norprogesterone.

*Example 14.—4-hydroxy-B-norprogesterone*

4-chloro-B-norprogesterone (3 g., prepared as in Example 13) is refluxed with 60 ml. of 5% aqueous potassium hydroxide solution according to the procedure of Example 4 to obtain the title product.

*Example 15.—21-hydroxy-B-norprogesterone acetate*

By treating 15 g. of 21-hydroxy-B-norprogesterone (Coll. Czech. Chem. Comm. 26, 2050 (1961)) with 30 ml. of acetic anhydride in 60 ml. of pyridine according to the procedure of Example 1 there is obtained the title product.

*Example 16.—4-chloro-21-hydroxy-B-norprogesterone acetate*

By treating 4 g. of 21-hydroxy-B-norprogesterone acetate (prepared as in Example 15) with 2 ml. of sulfuryl chloride according to the procedure of Example 2 there is obtained the title prdouct. By substituting sulfuryl bromide for sulfuryl chloride in this same procedure, 4-bromo-21-hydroxy-B-norprogesterone acetate is obtained. Hydrolysis of either of these esters with potassium carbonate results in the formation of the corresponding 21-alcohols.

*Example 17.—4,21-dihydroxy-B-norprogesterone*

Hydrolysis of 3 g. of 4-chloro-21-hydroxy-B-norprogesterone acetate (prepared as in Example 16) with 60 ml. of 5% refluxing aqueous potassium hydroxide according to the procedure of Example 4 results in the formation of the title product.

5

*Example 18.—4-chloro-B-norandrost-4-ene-3,17-dione*

A solution of 4 g. of B-norandrost-4-ene-3,17-dione (Chem. and Ind. 1665–66 (1958)) in 40 ml. of pyridine is cooled and then treated with 2 ml. of sulfuryl chloride. The reaction is carried out and worked up as in Example 2 to obtain the 4-chloro product. Substitution of sulfuryl bromide for sulfuryl chloride results in the formation of the corresponding 4-bromo product.

*Example 19.—4-hydroxy-B-norandrost-4-ene-3,17-dione*

A solution of 3 g. of 4-chloro-B-norandrost-4-ene-3,17-dione (prepared as in Example 18) and 3 g. of potassium hydroxide in 60 ml. of water and 300 ml. of tert-butyl alcohol is refluxed for twenty hours, and the reaction mixture worked up as in Example 4 to obtain the 4-hydroxy product.

It will be apparent to one skilled in the art of chemistry that in place of acetic anhydride when it is used as an esterifying reagent, there can be used propionic or butyric anhydrides. The resulting compounds are the propionate or butyrate esters, respectively. Furthermore, it is also apparent that any keto groups present may be ketalized with alcohols such as ethanol or ethylene glycol according to conventional procedure, e.g., in the presence of an acid catalyst such as p-toluene sulfonic acid. The product propionate and butyrate esters, and the ketals so formed are the full equivalents of those compounds specifically claimed.

I claim:
1. A compound of the formula:

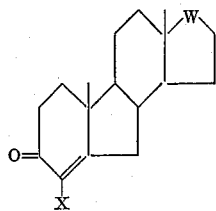

wherein:
X is selected from the group consisting of chloro, bromo, hydroxy, acetoxy; and
W is selected from the group consisting of

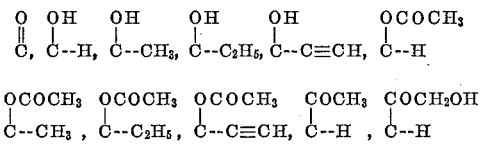

and

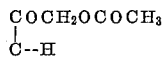

2. 4-halo-B-nortestosterone.
3. 4-halo-B-nortestosterone acetate.
4. 4-chloro-B-nortestosterone.
5. 4-chloro-B-nortestosterone acetate.
6. 4-hydroxy-B-nortestosterone.
7. 4-halo-B-norprogesterone.
8. 4-chloro-B-norprogesterone.
9. 4-hydroxy-B-norprogesterone.
10. 4-halo-17α-lower alkyl-B-nortestosterone.
11. 4-chloro-17α-methyl-B-nortestosterone.
12. 4-halo-17α-ethynyl-B-nortestosterone.
13. 4-hydroxy-B-nortestsoterone diacetate.

References Cited by the Examiner
UNITED STATES PATENTS

| | | | |
|---|---|---|---|
| 2,933,510 | 4/1960 | Julian et al. | 260—397.3 |
| 3,061,635 | 10/1962 | Tanabe et al. | 260—488 |
| 3,072,681 | 1/1963 | Kerwin | 260—488 |

LORRAINE A. WEINBERGER, *Primary Examiner.*

V. GARNER, *Assistant Examiner.*